United States Patent
Goldszmidt et al.

(10) Patent No.: US 7,113,986 B2
(45) Date of Patent: Sep. 26, 2006

(54) SYSTEM AND METHOD FOR MODELING INFORMATION SYSTEM CAPACITY AND ACCEPTING SESSIONS IN AN INFORMATION SYSTEM

(75) Inventors: Moises Goldszmidt, Foster City, CA (US); Bikash Sabata, Menlo Park, CA (US); Derek Palma, Union City, CA (US); Amitava Raha, San Jose, CA (US)

(73) Assignee: Business Signatures Corporation, Redwood City, CA (US)

( * ) Notice: Subject to any disclaimer, the term of this patent is extended or adjusted under 35 U.S.C. 154(b) by 527 days.

(21) Appl. No.: 09/797,006

(22) Filed: Feb. 28, 2001

(65) Prior Publication Data

US 2002/0019869 A1 Feb. 14, 2002

Related U.S. Application Data

(63) Continuation-in-part of application No. 09/770,828, filed on Jan. 26, 2001, now abandoned, which is a continuation-in-part of application No. 09/616,096, filed on Jul. 14, 2000, now abandoned, which is a continuation-in-part of application No. 09/615,892, filed on Jul. 14, 2000, now abandoned, and a continuation-in-part of application No. 09/615,886, filed on Jul. 14, 2000, now abandoned, and a continuation-in-part of application No. 09/615,678, filed on Jul. 14, 2000, now abandoned, and a continuation-in-part of application No. 09/615,887, filed on Jul. 14, 2000, now abandoned, and a continuation-in-part of application No. 09/616,384, filed on Jul. 14, 2000, now abandoned, and a continuation-in-part of application No. 09/616,488, filed on Jul. 14, 2000, now abandoned, and a continuation-in-part of application No. 09/615,962, filed on Jul. 14, 2000, now abandoned, and a continuation-in-part of application No. 09/615,677, filed on Jul. 14, 2000, now abandoned.

(51) Int. Cl.
*G06F 15/173* (2006.01)
*G06F 15/16* (2006.01)

(52) U.S. Cl. ..................... 709/223; 709/227
(58) Field of Classification Search ........... 709/227, 709/105, 218
See application file for complete search history.

(56) References Cited

U.S. PATENT DOCUMENTS

| | | | | |
|---|---|---|---|---|
| 6,377,996 B1 * | 4/2002 | Lumelsky et al. | .......... | 709/231 |
| 6,529,950 B1 * | 3/2003 | Lumelsky et al. | .......... | 709/218 |
| 6,631,122 B1 * | 10/2003 | Arunachalam et al. | ..... | 370/332 |
| 6,728,748 B1 * | 4/2004 | Mangipudi et al. | ......... | 718/105 |
| 2002/0152305 A1 * | 10/2002 | Jackson et al. | ............. | 709/224 |

* cited by examiner

Primary Examiner—Paul H. Kang
(74) Attorney, Agent, or Firm—Hickman Palermo Truong & Becker LLP

(57) ABSTRACT

A method for accepting a session in an information system server includes generating a representation of the session. The representation includes a first plurality of parameters that define a proposed additional load of the session on the information system server. A determination is made of a current state representation of the information system server. The current state representation is defined by a second plurality of parameters. The current state representation defines a current load on the information system server at a time instant. A determination is made of a headroom representation for the current state of the information system. The headroom representation is defined by a distance between a model surface.

29 Claims, 14 Drawing Sheets

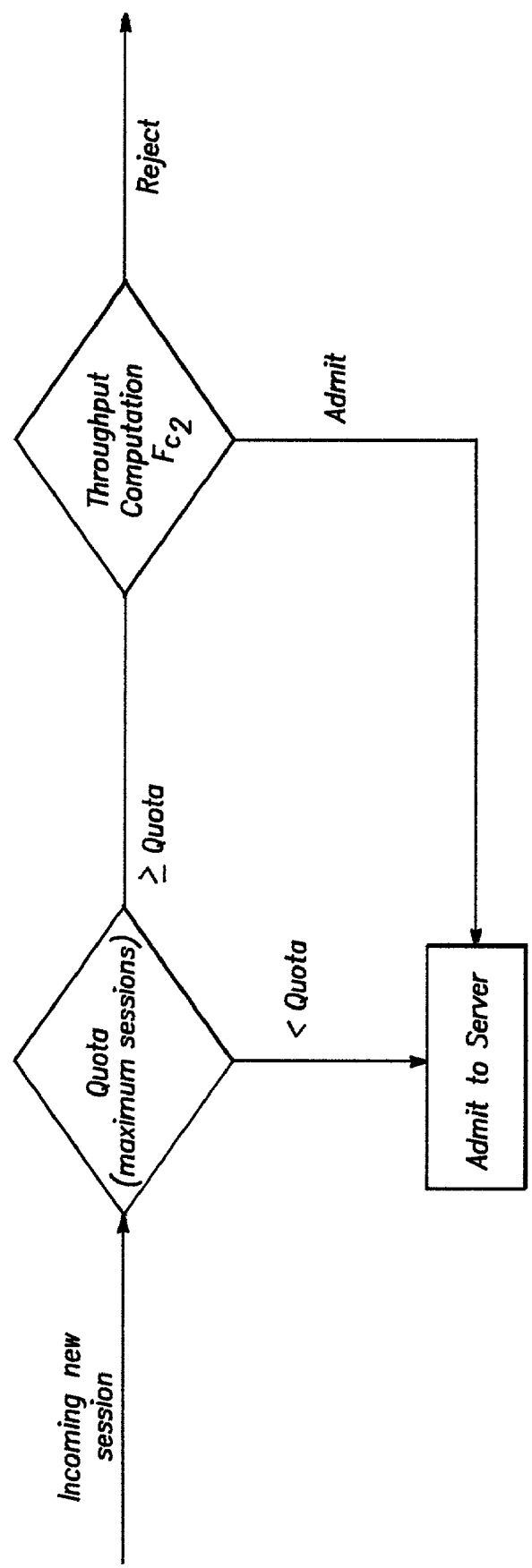
FIG.—4(c)

FIG.—10

SYSTEM AND METHOD FOR MODELING INFORMATION SYSTEM CAPACITY AND ACCEPTING SESSIONS IN AN INFORMATION SYSTEM

CROSS-REFERENCE TO RELATED APPLICATIONS

This application is a continuation-in-part of U.S. Ser. No. 09/770,828, filed on Jan. 26, 2001 now abandoned, which is a continuation-in-part of U.S. Ser. No. 09/616,096, filed on Jul. 14, 2000 now abandoned, which is a continuation-in-part of U.S. Ser. Nos. 09/615,892, 09/615,886, 09/615,678, 09/615,887, 09/616,384, 09/616,488, 09/615,962, and 09/615,677, all filed on Jul. 14, 2000, all of which are now abandoned and are hereby incorporated by reference in their entirety.

BACKGROUND OF THE INVENTION

1. Field of the Invention

This invention relates generally to methods and apparatus directed to dynamically control of an information system, and more particularly to a method and apparatus that delivers consistent and predictable service quality for multiple requests in an information system.

2. Description of Related Art

Several protocols exist in which one computer (a "host") receives and processes requests from a number of other computers ("clients"). For example, in applications involving the world-wide web, a server can receive and process many concurrent requests from different users on the internet, in this example, the server would be the host while each user device would be a client.

Requests can usually be grouped into sessions, with each session each having one or more related requests. For example, a multiple-request session could consist of a request requesting information over the world-wide web, and an associated response. Alternatively, a multiple-request session could consist of a commercial transaction, with related requests respectively used to locate a web site for a precise product, submit an order or billing and shipping information, and convey a confirmation of sale to a particular client. Whether a host is to process just a single request or a series of related requests, is usually important to quickly, accurately and completely service each request and each session.

The term "quality of service" refers a host's ability to, provide quick and consistent responses to a request, complete a session and consistency in doing so. As a particular host becomes more popular, and due to that popularity receives more requests, the host's processing resources can become stretched. For example, due to heavy traffic, a host may not be able to respond to a request at all, or the host may not provide a timely response (which can cause a client to "time-out" and generate an error). Poor quality of service can have significant consequences, as users may become frustrated and simply give up trying to reach a particular host, or the sponsor of the host may lose sales or fail to communicate needed information to any or all clients.

Two techniques are generally used to alleviate quality of service problems. First, more processing capacity can be added to the host, typically by either replacing the host with another, more powerful computer, or by providing multiple computers in parallel and delegating new requests to different ones of the multiple computers. While this first technique presents an effective way of reducing some quality of service problems, it is not always practical. For example, sometimes, due to inadequate planning, budgetary constraints or space constraints, additional processing capacity cannot be added. If demand for a host is not properly forecast, there may be a long lead time before additional processing capacity can be purchased and implemented. Additionally, the processing power may be placed inefficiently in the information system.

A second technique calls for applying "admission control," where only a certain number of client requests are processed ("admitted") and the remainder are refused; of the requests which are in fact admitted, all are ideally handled in an expedient manner without degradation of quality of service as to those admitted requests. An advantage of this technique is that admission control can be implemented in software, thus facilitating quick, inexpensive use with little advance notice. Unfortunately, typical admission control mechanisms operate by admitting requests on a request-by-request basis, and so, these typical admission control requests do not provide an adequate solution for multiple-request sessions. Also, the requests which are not admitted to the host are generally not handled at all, such that a client is not informed that the request has been refused or the client, if informed, is simply asked to "try again later." Typically, a refused client must try repeatedly to obtain service with no guarantee that future requests will be processed. For these reasons and others, techniques generally used to alleviate quality of service problems are not always successful. U.S. Pat. No. 6,006,269, incorporated herein by reference, discloses an admission control system having an admission control gateway, a deferral manager and a scheduler. When the admission control gateway receives a request that calls for a new client session, the gateway determines whether a processing threshold has been reached; if the threshold has been reached or surpassed, the request is passed to the deferral manager to formulate a response to the particular client. The scheduler is checked to determine a time when the host can expect to have processing resources available, and the deferral manager then formulates a time indication which tells the client when the client can expect to gain admission to the host.

A need exists for an admission control system having an improved ability to alleviate quality of service problems. In particular, a need exists for an admission control system which responds to all requests, whether or not those requests are actually admitted. Ideally, such system would operate by admitting entire sessions, not just individual requests, such that requests relating to a session in-progress are generally admitted. With a system of this type, admission control would at least provide a reliable means of finishing each session with high quality of service. Finally, a need exists for a system that provides some committed level of service to all clients, including those which may have been initially refused admission.

SUMMARY OF THE INVENTION

Accordingly, an object of the present invention is to provide a control method and apparatus with an improved ability to alleviate quality of service problems.

Another object of the present invention is to provide a control method and apparatus that responds to all requests whether or not those requests are actually admitted.

Yet another object of the present invention is to provide a control method and apparatus that provides some level of service to all clients, including those which have been refused admission.

An object of the present invention is to provide a method and apparatus that enables e-businesses to deliver predictable and consistent service levels when there are sudden and unpredicted changes in traffic and infrastructure.

Still another object of the present invention is to provide a method and apparatus that enables e-businesses to deliver multiple differentiated service levels that are predictable and consistent when there are changes in traffic and infrastructure.

Yet another object of the present invention is to provide a method and apparatus that enables e-businesses to create different customer classes and service levels and serve them in terms of priority when there are changes in traffic and infrastructure.

A further object of the present invention is to provide a method and apparatus that minimizes server and site meltdown under high level traffic conditions.

Yet a further object of the present invention is to provide a method and apparatus that proactively and precisely plans and provisions web site infrastructures for future growth and for under certain conditions.

Another object of the present invention is to provide a method and apparatus that dynamically demands and manages extra capacity when the service levels are violated or are in jeopardy of being violated.

These and other objects of the present invention are achieved in a method for accepting a session in an information system server that includes generating a representation of the session. The representation includes a first plurality of parameters that define a proposed additional load of the session on the information system server. A determination is made of a current state representation of the information system server. The current state representation is defined by a second plurality of parameters. The current state representation defines a current load on the information system server at a time instant. A determination is made of a headroom representation for the current state of the information system. The headroom representation is defined by a distance between a model surface.

In another method of the present invention, a representation of the session is generated. The representation includes a first plurality of parameters. The first plurality of parameters define a proposed additional load of the session on the information system server. A determination is then made of a current state representation of the information system server. The current state representation is defined by a second plurality of parameters and further defines a current load on the information system server at an instant in time. A determination is then made of a headroom representation for the current state of the information system. The headroom representation is a distance between a model surface. The model surface indicates a capacity of the information system server. A comparison is made of a magnitude of the headroom representation to a magnitude of the additional load of the session on the information server representation.

BRIEF DESCRIPTION OF THE FIGURES

FIG. 4(c) is a flow chart illustrating a reactive methodology for admitting new content requests to an information system according to one embodiment of the present invention.

DETAILED DESCRIPTION

Figure 1:
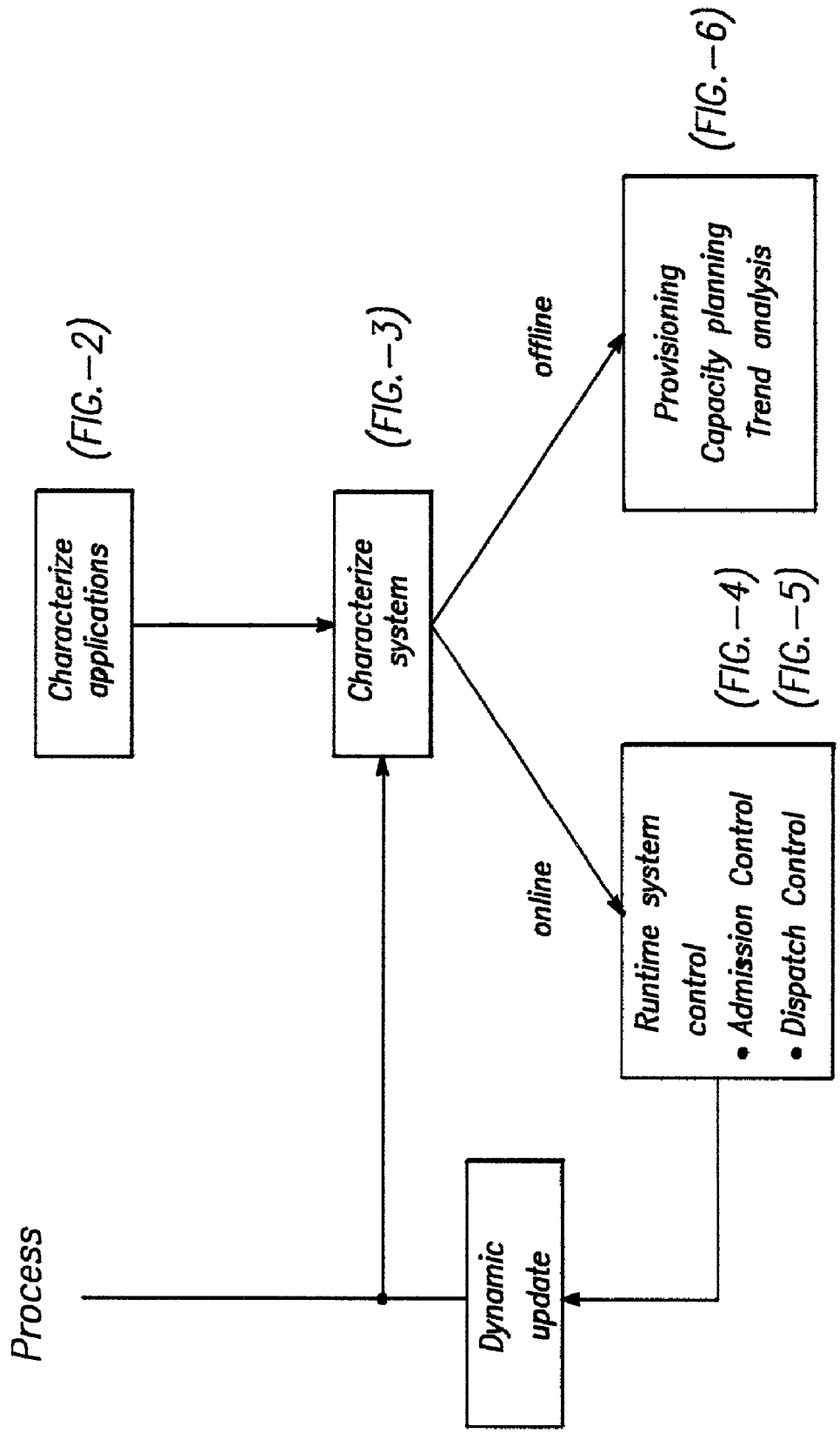
FIG. 1 is a flow chart illustrates characterization of an information system according to one embodiment of the present invention.

One embodiment of the present invention is a method and system that enables, (i) consistent and predictable delivery of service levels to content or other service requests in the midst of changes to content or other service request levels and mixes and information system infrastructure behavior based on defined business objectives, (ii) consistent and predictable delivery of multiple, differentiated service levels to different customer classes and service requests in the midst of changes to request levels and mixes and information system infrastructure behavior based on defined business objectives, (iii) absolute prevention of server or information system overload ("meltdown") in the midst of extreme and unanticipated changes in either traffic or information system infrastructure coupled with business defined alternatives on how to best deliver services to customer classes and services during these changes and (iv) the ability to proactively and precisely provision and plan for information systems infrastructure growth and service level delivery from the information systems which takes into consideration potential changes in content or other service request levels, content or other service request mixes, changes to the information system and changes to service levels offered.

These different customer classes include but not are not limited to, most profitable customers, most frequent customers, customers who are currently on the information system as compared to those who are about to enter the information system, first time customers, customers specifying a specific content request such as book buying verses book browsing, and the like. Examples of different service levels include but are not limited to, guaranteed fastest access to the information system, guaranteed response times from the information system, guaranteed transaction protection during heavy traffic conditions, guaranteed information system access during all conditions, and the like. Priority of serviced is determined by the manager of the information system in line with its business objectives. It will be appreciated that the present invention is not limited to the preceding.

A host processing system can be utilized to provide priority access based on multiple classes of service and deferral of certain content requests. A web page can be downloaded to a client having automatic or elective attempts to later attain access. The host processing system allocates incoming content requests to one or more processing tasks according to priority or class of service (each referred to as "priority"). Priority can be associated with each content request by, an admission control and dispatching system, information contained within a content request, a client system, the server or other components of the information system, and the like.

In one embodiment, priority can be assigned to content requests upon deferral because the server is too busy to handle new sessions represented by the content requests such that when later re-submitted, the content requests are then-handled on a priority basis. In one example, deferred content requests can be specifically assigned an appointment for re-submission at a time when it is thought that the server can guarantee priority processing to the content request. Additionally, the information system can, send a message to the requester, be unavailable for the content request, be unavailable for the content request for a selected period of time, queue the content request for admission to the information system, gracefully degrade a quality service compliance of sessions currently existing in the information system gracefully degrade a quality service compliance of new sessions incoming to the information system, gracefully degrade new and existing sessions and gracefully degrade lower priority customers as defined in the user's quality of service objectives. It will be appreciated that the handling of deferred content requests can employ various combinations of the above and that the present invention is not limited to the preceding examples which are given by way of illustration.

For purposes of these specification, gracefully degrade means incrementally relaxing one or more of the user's quality of service objectives, including but not limited to response time, probability of response time, consistency of response time, number of concurrent users, number of concurrent content requests, and the like, for various customer classes and services.

In one embodiment, the host processing system includes an admission control system that normally admits, delays and/or rejects content requests from a client system to a server. If processing resources of the of the information system are strained, the admission control system can admit content requests based the user's quality of service objectives and priorities. Admission control software operates principally on a server within the information system.

Examples of the user's quality of service objectives include but are not limited to, speed of content delivery for a specified time, consistency of speed of content delivery, information system response time, information system response time consistency, the number of concurrent users or content requests and the like.

Referring now to FIG. 1, one embodiment of a method for determining the behavior of an information system application is illustrated. As illustrated, the information system includes at least one software application, a network information delivery system as well as combinations of software applications with network information delivery systems. Examples of software applications include but are not limited to e-commerce and other internet based transactions such as browsing, buying, requesting specific information or pages, and the like. Each network information delivery system has server and network components which may include but are not limited to one or more of the following as well as combinations of a, web-server, application server, data base server, fire wall server, secure transaction server, load balancer, web switch, network quality of service manager, network bandwidth manager, network traffic shaper, cache, content delivery system, and the like. These information system components may reside in one or more geographic locations and connected by a variety of different networking configurations and technologies well known to those skilled in the art.

The behavior of the information system application for content requests, volumes and mixes, and various load conditions is determined. Load conditions are the amount of consumed resources of the information system at a given point in time. Examples of consumed resources include but are not limited to, utilization of computing resources, utilization of network bandwidth resources, utilization of data-base resources, and the like. The user's quality of service objectives are then ascertained for various customer classes and services. The information system's capacity allocation is then prioritized to best meet the user's quality of service objectives. On an instantaneous and on-going bases, changes are detected in the information system application and delivery system behaviors as a result of changes in content request patterns, volumes and mixes. In response to detecting changes that effect a committed or guaranteed delivery of the user's quality of service objectives, the behavior of the information system and/or application is updated periodically or dynamically in order to better meet the user's quality of service objectives.

Additionally, the information system application's behavior can change due to, software or hardware revisions and changes, different traffic volumes, mixes and content requests. Changes in traffic mix can include changes in content requests, geography or user types, software and hardware revisions or changes.

Detecting changes in the information system application can result in a determination of control techniques required by software and/or network components of the information system application in order to insure that the user's quality of service objectives are met. Examples of detecting changes in the information system include determining the amount of capacity that needs to be reserved in the information system application to insure that the user's quality of service objectives are met, updating behavior characteristics of the information system based on recent and/or historical observations of the information system application, updating behavior characteristics of the information system based on recent and historical observations of the information system application. Examples of control techniques include but are not limited to, changing the policies or weightings of load balancers, web-switches, and/or network bandwidth managers, in order to reallocate patterns of content requests and meet the user's quality of service objectives. These control techniques can be initiated as a result of an observed changes in content request volume or mix that potentially impact the user's quality of service objectives. Additionally, the control techniques can be initiated as a result of a change in the information system infrastructure such as the addition or deletion of computing or networking components as well as additions, deletions or revision of software applications, and other changes in the information system that can impact the user's quality of service objectives.

In another embodiment of the present invention, the behavior at least one software application coupled to the network information delivery system is determined for various levels and patterns of user content requests. Then, the network information delivery system's behavior is determined as a function of user content requests. The user's quality of service objectives are ascertained and a capacity allocation of the network information delivery system is prioritized based on the user's quality of service objectives and priorities. Changes in the software application and/or network information delivery system are then determined. The behaviors of the software application and the network information delivery system are updated dynamically in response to detecting changes that effect the user's quality of service objectives.

The ability to characterize the software application and information system, as a function of various user content request volumes and mixes, coupled with the control techniques described above, allows the information system to deliver consistent and predictable service levels. These are delivered in the midst of unanticipated changes from the infrastructure and/or the content request side consistent with the user's quality of service objectives and priorities.

Figure 2:
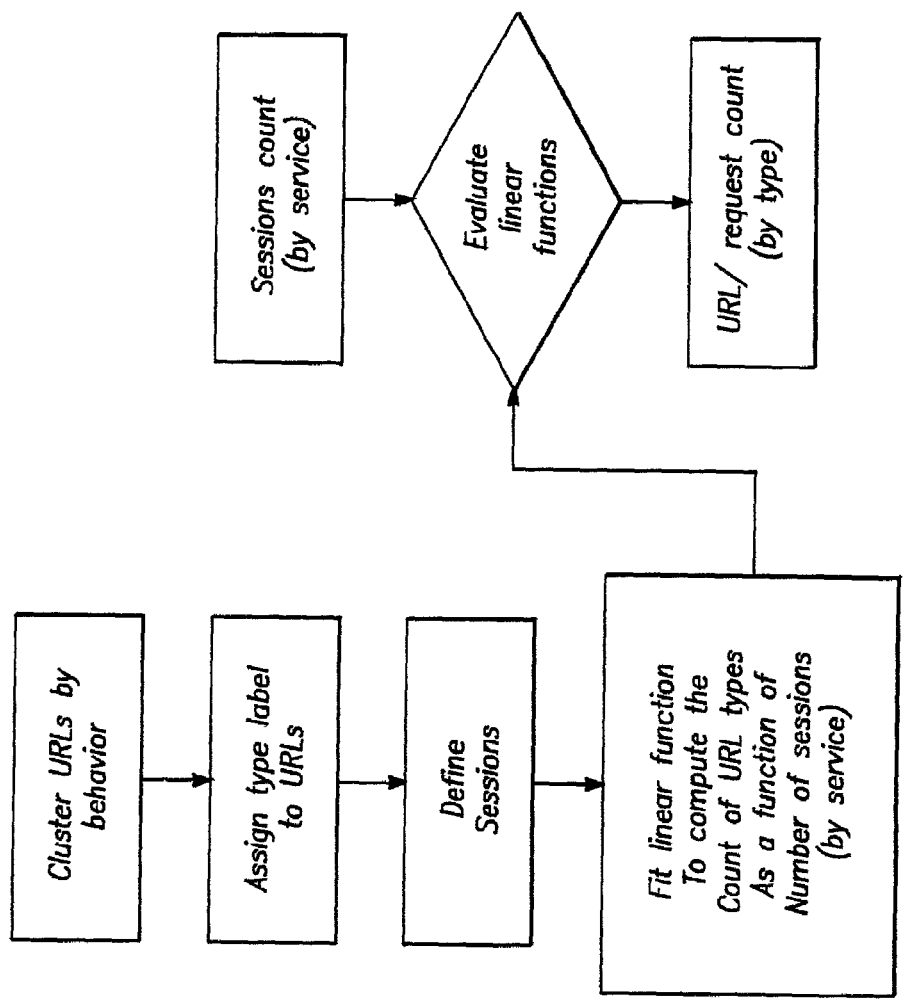
FIG. 2 is a flow chart illustrating a process for characterizing software applications by behaviors and content requests according to one embodiment of the present invention.

Referring now to FIG. 2, after the behavior of an information system is determined the software application is then characterized via a method of grouping content request's by one or more behavior labels for each content request. Sessions for various user and service types are defined. Sessions are a group of one or more content requests. The sessions are then modeled to create representative sessions. Each session is then matched with one or more representative sessions.

A representative session can be a characterization of a group of content requests in terms of common properties. Common properties are typical behavior or statistical properties. Examples of behavior properties include capacity usage, the time required to process a new content request, the amount of capacity required to process the new content request and the number of database interactions of the new content request the amount of response time required to process the new content request.

New content requests include but are not limited to URL's. Each session can be a group of URL's, one or more content requests and one or more content requests from a single requestor. The requestor is either a human being or a machine such as another server or computer from the same or different information system.

Each session can be defined by its service type, number and type of content requests it contains and content requests requested by a given browser. Content requests are labeled according to the content request's behavior characteristics under a specific application, traffic, load and information system conditions.

In another embodiment of the present invention, a method of clustering content requests by one or more behavior labels is provided. Sessions are defined for various user and service types. The sessions are modeled to create representative sessions. Each session is then matched with one or more representative sessions.

In another embodiment of the present invention, a method of clustering content requests by grouping by one or more behavior labels for each content request by the user's quality of service objectives is provided. Sessions are defined for various user and service types. The sessions are once again modeled to create representative sessions and each session is then matched with one or more representative sessions.

The present invention also provides a method of grouping content request's by one or more behaviors. Each content request is labeled by mix. Sessions are defined for various user and service types. Again, the sessions are modeled to create representative sessions and each session is matched with one or more representative sessions.

In another embodiment, content request's are grouped by one or more behaviors by labeling each content request by capacity. Sessions are then defined as before followed by modeling to create representative sessions and matching each session with one or more representative sessions.

Figure 3:
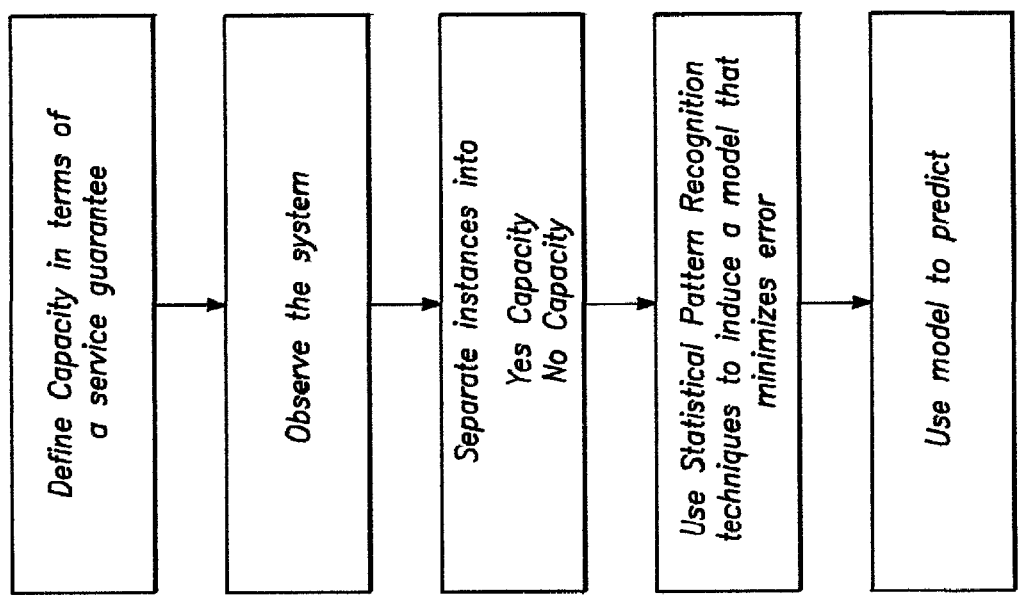
FIG. 3 is a flow chart illustrating a process for generating capacity and provisioning functions according to one embodiment of the present invention.

Referring now to FIG. 3, after the application is characterized a capacity function and provisioning function of the information system are generated. In one embodiment, a method of defining the required information delivery system capacity, as a function of the user's service quality objectives, is provided. The information delivery system monitors behavior to understand under what conditions the user's service quality objectives are met or not met. The conditions in which the user's service quality objectives are met or not met are captured. Statistical techniques are applied to the conditions captured. Examples of statistical techniques include but are not limited to regression analysis, Baysian modeling, and the like. A model is then created that describes the conditions in which the user's service quality objectives are met or not met.

Creation of the model can take various forms such as analytical techniques to minimize an error associated with the model, statistical techniques to minimize an error associated with the model and probability techniques to minimize an error associated with the model. Additionally, the model can be used to predict a state of the information system required to meet selected user quality of service objectives.

Figure 4A:
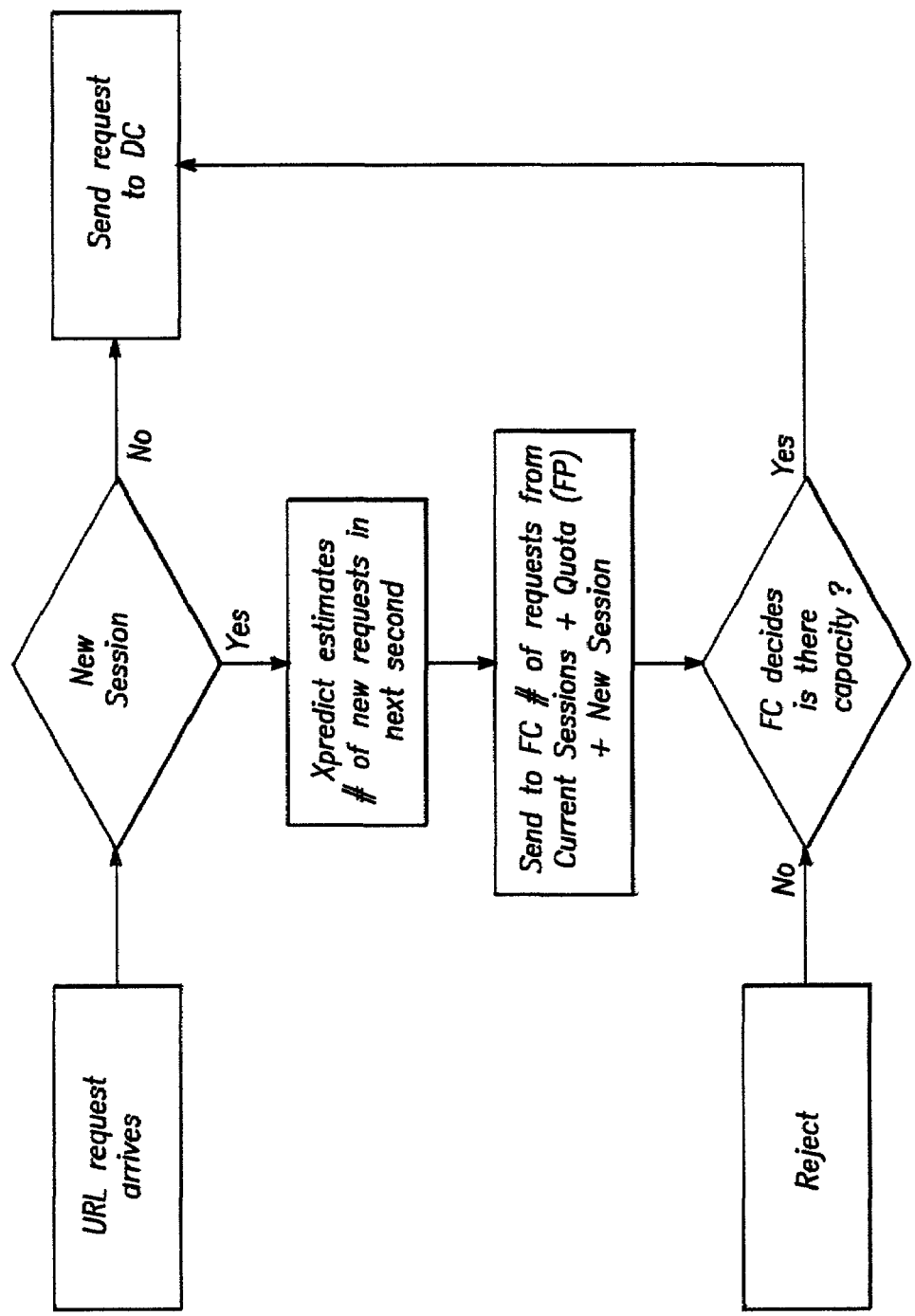
FIG. 4(a) is a flow chart illustrating an admission control methodology for admitting new content requests to an information system according to one embodiment of the present invention.

A flow chart of the admission control methodology of the present invention is illustrated in FIG. 4(a). The present invention also provides methods to determine when and how to admit a content request to the information system. These methods may be predictive, reactive and combinations of the two. The user's quality of service objectives and a content request are received at the information system. A determination is made to ascertain if the content request is for an existing new session. The content request is sent to a dispatch control function when the content request is for an existing session.

After the user's quality of service objectives and new content request are received at the information system a determination is made to ascertain if the content request is for an existing session or a new session. When the content request is not part of an existing session, future content requests expected in a predetermined time for the information system are predicted.

New content requests expected in the predetermined time can then be aggregated with existing content requests currently being processed by the information system to create an aggregated content capacity request. New content requests and current content requests are then processed to determines if the information system can process the aggregated content capacity request in compliance with the user's quality of service objectives. This processing is based on behavior of the information system for user content requests, volumes and mixes, and various load conditions as disclosed in FIG. 1. The content request is either accepted or rejected. If accepted, the content request is then sent to dispatch control as described in FIGS. 5(a) and 5(b) hereafter. When the content request is rejected, it is processed according to a user defined rejection rule.

The user defined rejection rule can include, sending a message to the requester, making the information system unavailable for the content request, making the information system unavailable for the content request for a selected period of time, queuing the content request for admission to the information system, gracefully degrading a quality service compliance of sessions currently existing in the information system gracefully degrading a quality service compliance of new sessions incoming to the information system, gracefully degrading new and existing sessions and gracefully degrading lower priority customers as defined in the user's quality of service objectives.

Figure 4B:
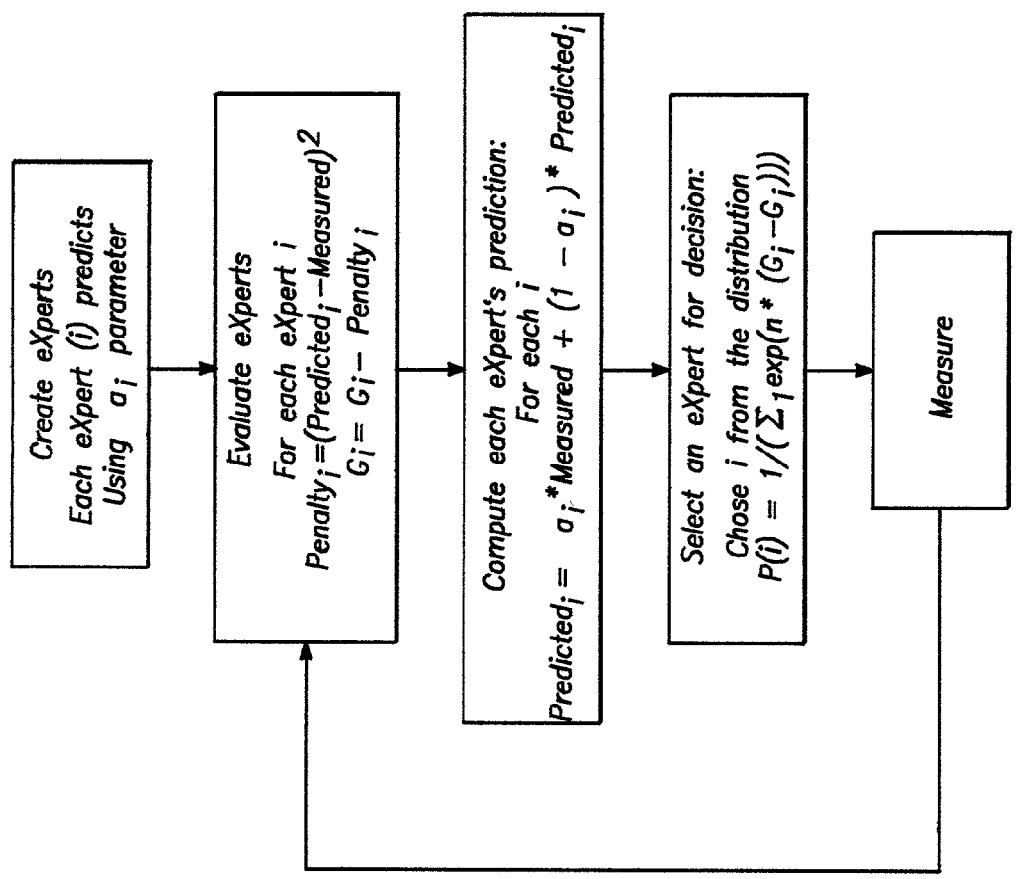
FIG. 4(b) is a flow chart illustrating a predictive admission control methodology for admitting new content requests to an information system according to one embodiment of the present invention.

FIG. 4(b) illustrates a method for determining a number of future content requests that will arrive at the information delivery system for a pre-determined future period of time. A number of models are created that predict the number of future content requests. A determination is made for each of its respective predictions for the pre-determined future period of time. A model is then selected which has the least error, or lowest penalty function, associated with its prediction to create a best model predictive assessment of the next interval's number of content requests. The number of current content requests is added to the predicted future content requests to create an aggregate total number of content requests. The aggregated total number of content requests is then sent to a capacity function to determine if at that instant the information system has enough available capacity to service the aggregated number of content requests in compliance with the user's quality of service objectives.

A penalty function is a method to determine the accuracy of a model that predicts the number of content requests. An example of a suitable function useful with the present invention is achieved by means of actual observation of the number of content requests during a selected time period which are then compared to the predicted value. This assessment may be performed at any instant in time or over a period of time in order to construct a selection function which determines the predictive models that are the most accurate. Such assessments are dynamic and changed with modifications of the user's quality of service objectives or changes to the information system.

The selection function can include construction of a probability distribution over a set of predictive models. The construction of the probability distribution then determines the accuracy of the models and the stochastic selection of the models according to this distribution. An example of a probability distribution is:

$$P[j] = \frac{1}{\sum_{i=1}^{n} e^{n(gain_i - gain_j)}}$$

where n is a free parameter called "learning rate" and $gain_i$ is an accumulated penalty of algorithm i and P[j] is the probability for algorithm j. Additionally, each model can be of the form (recursive):

Prediction(i)=alpha*observation+(1−alpha)*Prediction (i−1) for different values of alpha.

Referring now to FIG. 4(c), an example of a reactive method for producing pre-determined estimates of the volume and mix of content requests that the information system can process, without compromising the user's quality of service objectives, is illustrated. In this embodiment, a quota of maximum sessions that a server can handle while still maintaining the user's quality of service objectives is calculated. The quota calculation can be achieved by observing a fixed number of content requests and also be determined by the number of times the user's quality of service objectives have been violated divided by the number of content requests.

A determination is then made to see if the content request exceeds the quota. The content request is sent to the server if the quota is not exceeded. If the quota is exceeded, and the user's quality of service objectives are met, the content request is sent to a throughput computation to determine whether or not the server can process any more content requests. If the quota is exceeded, and the user's quality of service objectives are not met, the content request is rejected, redirected or delayed. When the quota is exceeded, and the user's quality of service objectives are not met, then the user's quality of service objectives can be downgraded. The content request is then sent to the throughput function whether or not the server can process any more content requests.

The throughput calculation can be a capacity utilization of the server using content request arrival rates. Additionally, the throughput calculation can be latencies and a quota of maximum content requests that the server can handle while still maintaining the user's quality of service objectives.

Figure 4D:
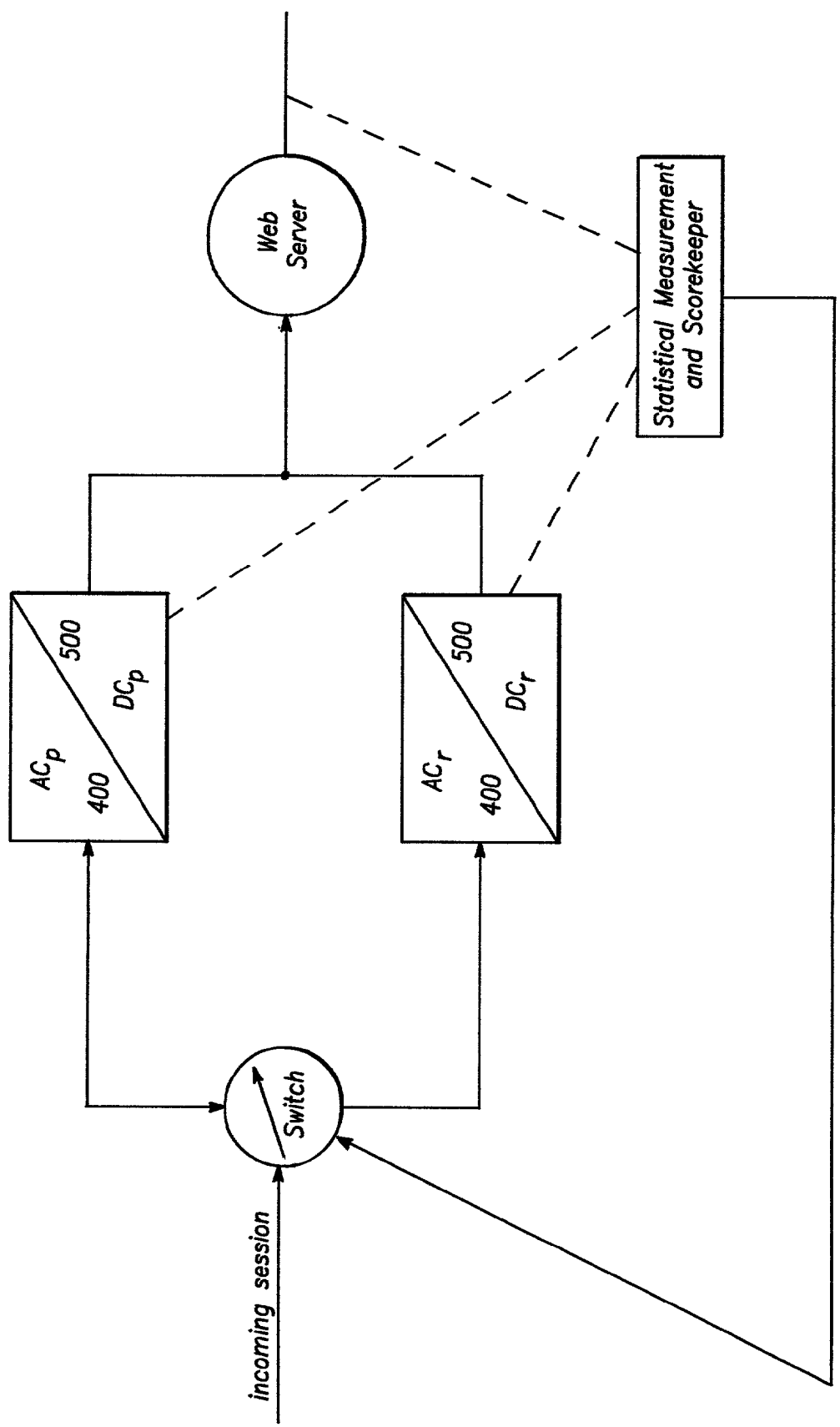
FIG. 4(d) is a flow chart illustrating a process for determining which of a predictive or reactive methodology for admitting new content requests to an information system according to one embodiment of the present invention.

Referring now to FIG. 4(d), a control method for admitting a content request to an information system includes determining if a predictive or a reactive control method provides a better fit to the user's quality of service objectives. After this determination is made, the result is dispatched and sent to a web-server. Additionally, on-going statistical results of the predictive and reactive functions can be maintained to determine if the predictive or reactive method is better at any instant in time or over a historical period of time. Dynamic switching, via real time feedback to the information system, is made between the predictive or reactive methods based on which one is better is meeting the user quality of service objectives.

It will be appreciated that the present invention is not limited to the preceding specific examples of predictive and reactive control methods.

Figure 5B:
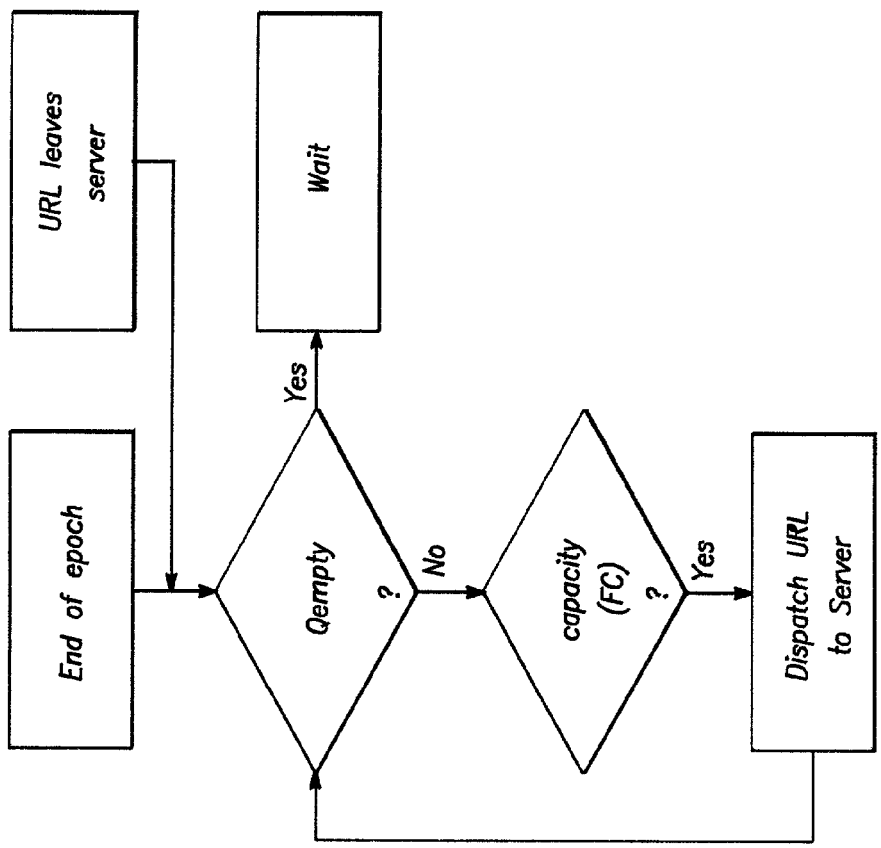
FIGS. 5(a) and 5(b) are flow charts that illustrate process for dispatching content requests to a capacity function and a server according to one embodiment of the present invention.
Figure 5A:
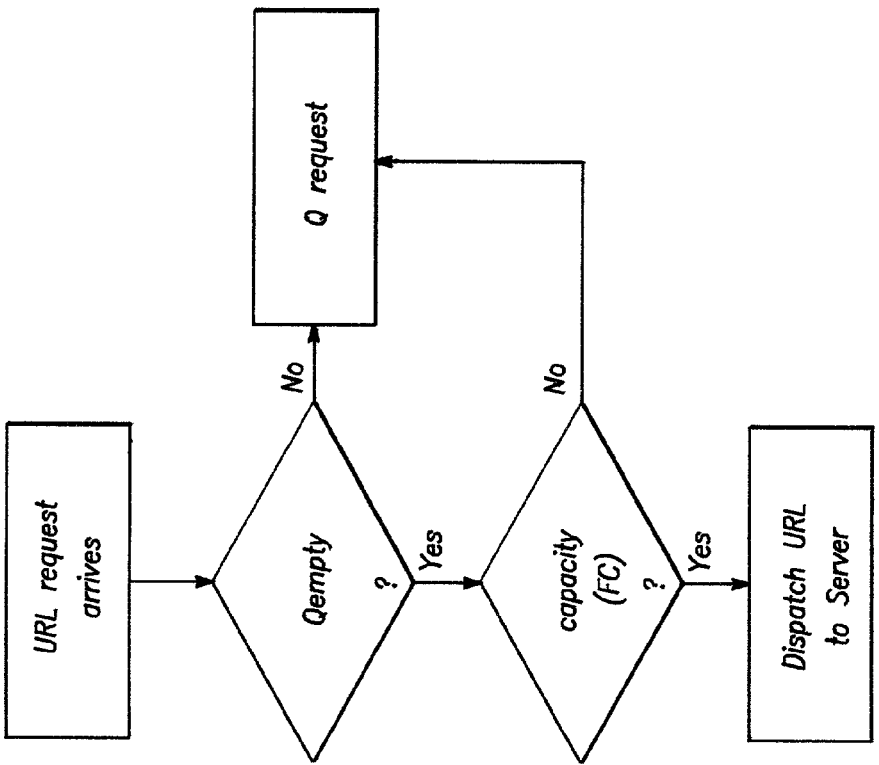

As illustrated in FIGS. 5(a) and 5(b), the present invention also provides a method for admitting content requests to an information system that includes a server and a queue of content requests coupled to the server. A determination is made to ascertain if the queue is empty. The capacity function of the server is checked to see if the server has the capacity to admit the new content request. When the server has capacity, and the queue is empty, the new content request is dispatched to the server.

Additionally, the throughput capacity function of the server is checked to determine if the server can admit the new content request. When the server has the throughput capacity, the new content request is dispatched to the server.

In another embodiment, when the queue is empty and the server has the capacity to receive new content requests, the new content request is then dispatched to the server. In the event the server does not have capacity, then the new content request remains in the queue. Thereafter, the server's capacity is periodically checked. Alternatively, the server is checked for capacity whenever a content request is completed and leaves the server.

In another embodiment, the new content request is only admitted to the queue when it is empty. Then, the server is checked for capacity when a content request is completed and leaves the server. It yet another embodiment, when a content request is completed and leaves the server the queue is checked to see if it is empty. When the queue is not empty the capacity of the server is checked. If the server has capacity then the new content request is admitted to the server. If the server doesn't have capacity the new content request remains in the queue.

In another embodiment, new content requests are dispatched to the information system. The queue is periodically checked, irregardless of whether or not a content request is admitted to or leaves the server.

Figure 6:
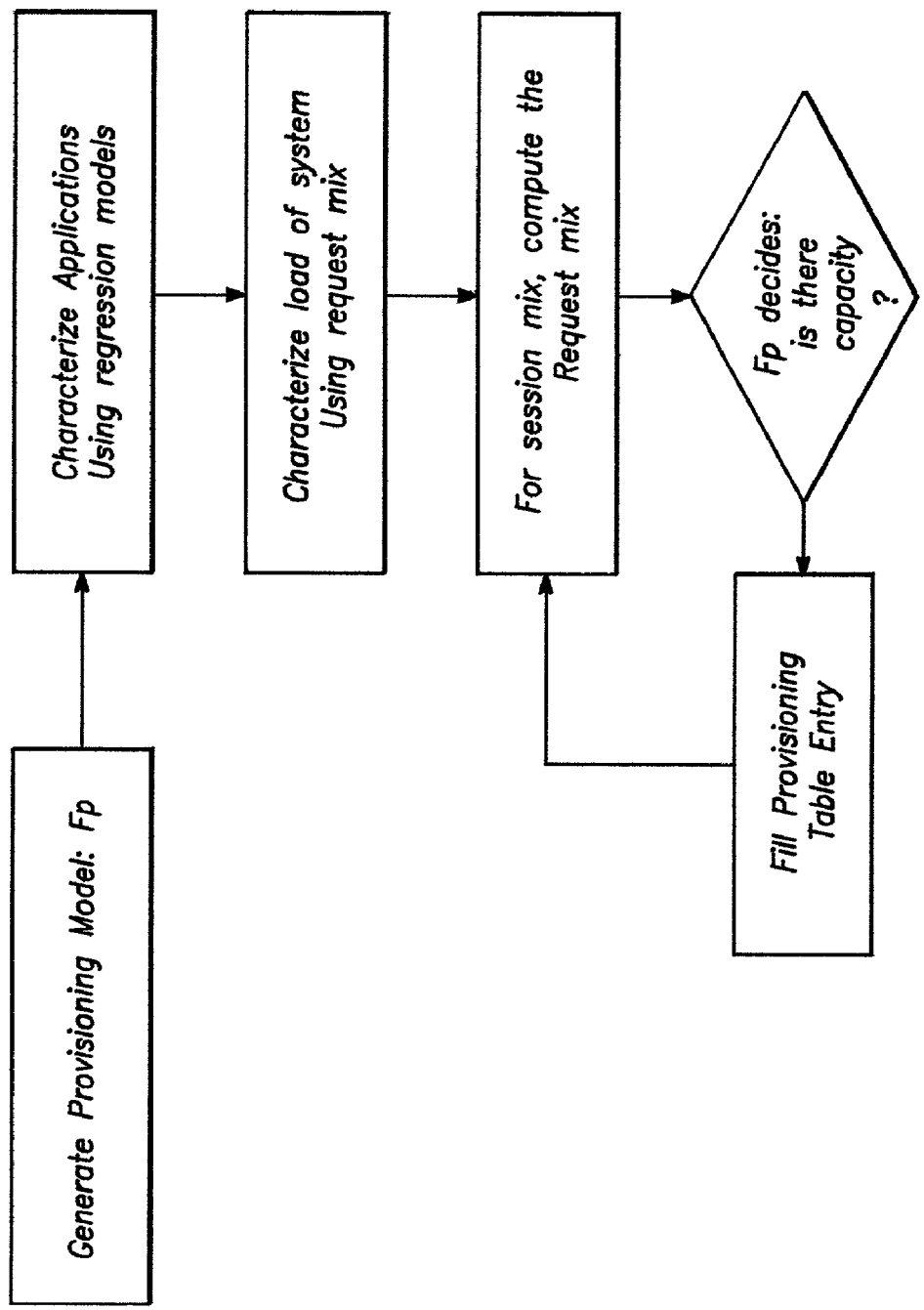
FIG. 6 is a flow chart illustrating a process for provisioning an information system according to one embodiment of the present invention.

Referring now to FIG. 6, a provisioning model is created. The provisioning model prepares the capacity and behavior of the information system to accommodate and to meet the user's quality of service objectives. A software application is characterized based on its impact on the capacity of the information system. Additionally, utilization of the capacity of the information system is characterized for software applications, software or hardware revisions and changes, different traffic volumes, mixes and content requests.

A prediction of aggregated incoming and exiting sessions of the information system is received. A model is then produced that correlates a number of sessions to the capacity utilization. Each session is broken down into individual content requests. The model is then applied to individual content requests to determine if the information system has sufficient capacity to process the aggregated content requests while meeting the user's quality of service objectives.

Figure 7:
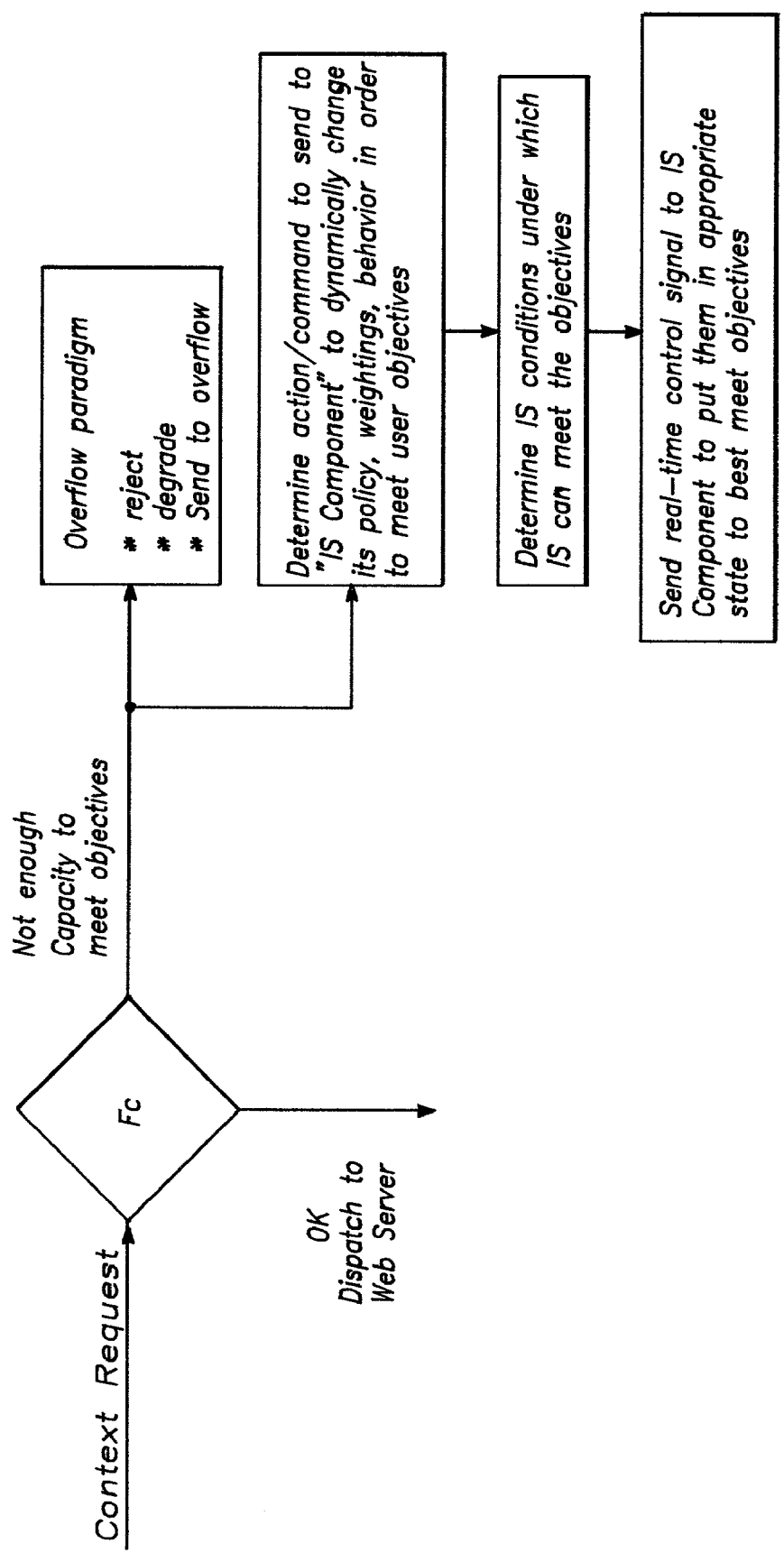
FIG. 7 is a flow chart illustrating a process for dynamically controlling components of an information system according to one embodiment of the present invention.

Referring now to FIG. 7, the present invention can also dynamically control the information system in order to enforce the user's quality of service objectives. In this embodiment, a capacity function is checked to see if the information system has sufficient capacity to process an incoming content request in compliance with the user's quality of service objectives. If the information system does not have sufficient capacity at that instant, then a real time control signal may be sent to a component within the information system. The real time control signal changes the component's policy, weighting or behavior in a manner to better meet the user's quality of service objectives. Again, the components include but are not limited to a, web-server, application server, data base server, fire wall server, secure transaction server, load balancer, web switch, network quality of service manager, network bandwidth manager, network traffic shaper, cache, content delivery system, and the like. For purposes of this specification, a real time control signal can be, a change in a traffic allocation rule, a change of a traffic allocation weighting of the information system components, a change of bandwidth allocation weighting of the information system components, an initiation of server overflow resources, and the like. The real time control signals are sent to the information system by a variety of means including but not limited to, a command line interface, a application program interface, one or more cookies, and the like.

If the queue is not empty the capacity of the server is checked. When the server doesn't have capacity the new content remains in the queue. A determination is then made of actions and commands to send to the information system components. These actions and commands place the information system components in a more readily suitable state for meeting the user's service of quality objectives. Additionally, conditions are determined for when the information system components can meet the user's quality of service objectives. At least one real time control signal is sent to the information system components in response to determining the conditions in which the information system components can meet the user's quality of service objectives. The information system components are subsequently placed in a state to meet the user's quality of service objectives. The behavior of the information system components is modified in order to change the capacity allocation of the server.

Feature Vectors

Embodiments of the invention employ feature vectors, which are employed by the models of capacity. The feature vector may include as elements any n resources in an information system which are indicative of the information system's capacity. These may include, but are not limited to, any one of the following performance parameters:

Load measurements on CPUs in the information system
Load measurements on memory in servers employed in the information system
transactions per second conducted in databases in the information system
rate at which requests arrive from referral URLs to the information system
number of sessions in the information system
CPU utilization in the information system
Database utilization in the information system Requests may be classified into groups of similar behavior as reflected in the measurements in each of these resources. A "session," in turn, may be defined as a combination of the requests groups. The classification of requests into groups may be performed by clustering techniques. A clustering technique employed in one embodiment involves use of a Greedy Hierarchical Anglomerative Clustering (HAC) and Kullback Leibler (KL) based k-means clustering. Other clustering techniques for classifying the requests will be apparent to those skilled in the art. By clustering the requests into a small number of categories, the system reduces the computational complexity of operations on feature vectors.

The session is represented using a regression model that generates the combination of the request groups. Embodiments of the session model use a regression model and a typical vector representation. Other embodiments include piecewise linear and non-linear models.

Figure 8:
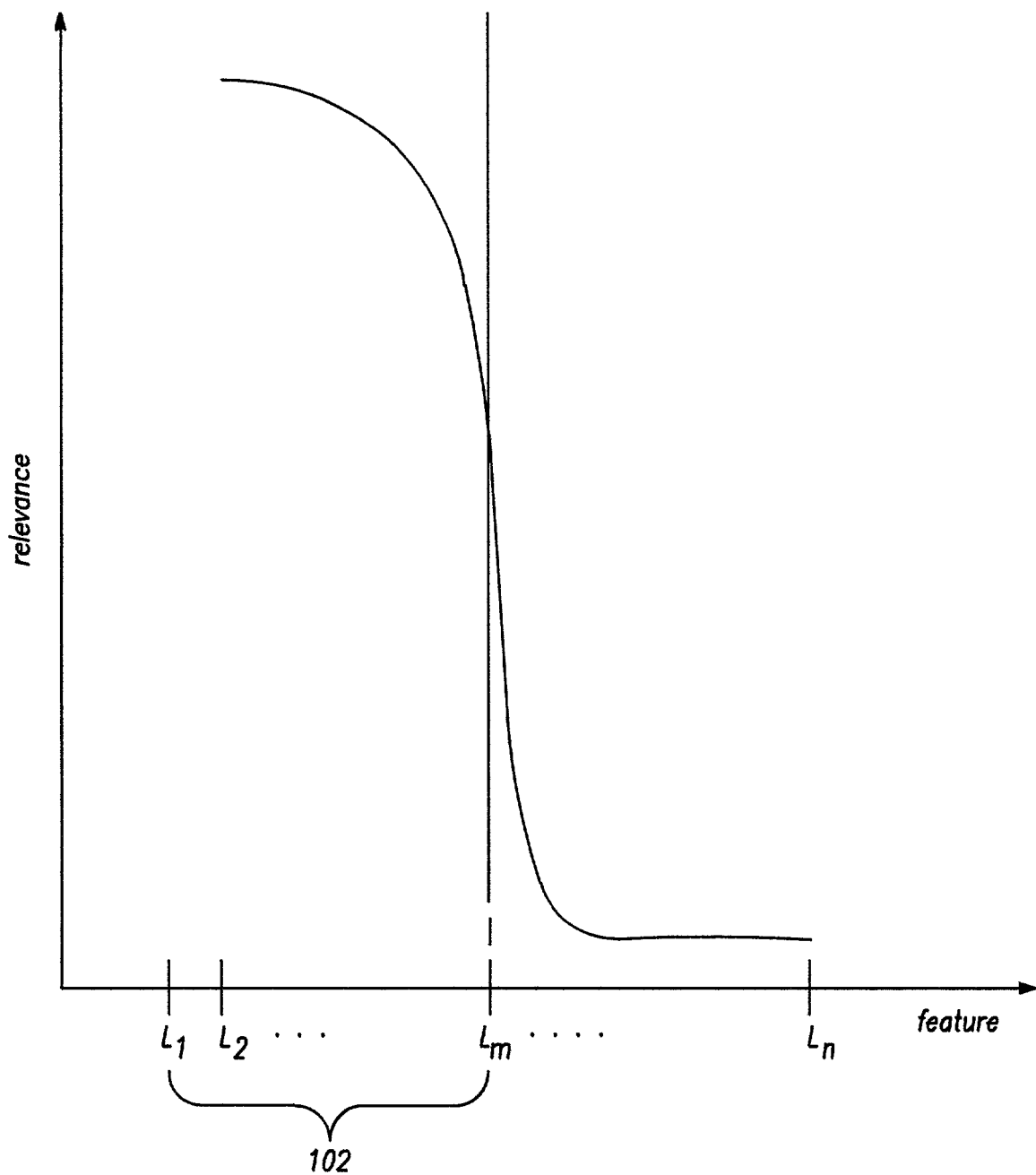
FIG. 8 illustrates a relative relevance of measurements of resource states in an information system with respect to a capacity of the network.

Embodiments of the invention include methods for compressing feature vectors further into their most relevant elements. Consider a feature vector $f_p$, an n-tuple with elements $L_1$ through $L_n$, wherein $L_1$ through $L_n$ represent measurements across the information system resources, and are listed in decreasing order of relevance. Empirical results demonstrate that the relevance of the elements $L_1$ through $L_n$ decreases exponentially 100, as illustrated in FIG. 8. As such, the feature vector may be compressed to a first few elements $L_1$ through $L_m$, m<n, where $L_1$ through $L_m$ are the m most relevant elements 102. In embodiments of the invention, search algorithms may be employed to discover the most relevant features. In some such embodiments, a Fisher ratio may be employed to determine the most relevant of the elements $L_1$ through $L_n$. Other algorithms for compressing the feature vector will be apparent to those skilled in the art.

Generation of Models

Embodiments of the invention include a model of capacity utilization of an information system which is employed to determine whether or not the information system has sufficient capacity for a session at a given time. As the feature vector represents the state of a network at a given instant in time, a model for the system may be generated by plotting the evolution of feature vectors in an information system over time.

In one embodiment of the present invention, a method is provided for accepting a session in an information system server and includes generating a representation of the session. The representation includes a first plurality of parameters that define a proposed additional load of the session on the information system server. A determination is made of a current state representation of the information system server. The current state representation is defined by a second plurality of parameters. The current state representation defines a current load on the information system server at a time instant. A determination is made of a headroom representation for the current state of the information system. The headroom representation is defined by a distance between a model surface.

The model surface indicates a capacity of the information system server. A comparison is made of a magnitude of the headroom representation to a magnitude of the additional load of the session on the information server representation. Again, the information system server can be a web server, application server, database server, cache server, firewall server or any other type of server in the information system.

The first and second plurality of parameters can include (i) one or many metrics for CPU loads on the information system serve and (ii) at least one or many metrics for memory utilization on the information system server, (iii) one or many metrics for transactions per second conducted in databases on the information system server, a number of user sessions conducted on the information system server, (iv) one or many metrics for database utilization on the information system server and (v) one or many metrics for the traffic on the network links between the different information system components.

Memory utilization is can be from swaps, disk reads and faults. If the information system's quality of service objectives or performance objectives are being met, the session can be accepted in the information system server.

If the objectives or performance objectives is violated or in jeopardy of being violated, (i) the session can be delaying, redirecting or rejected from the information system server, (ii) an extra capacity can be demanded from a second information system server that is in communication with the first information system server or (iii) an infrastructure component other than an information system server can be signaled. Examples of suitable infrastructure components that can be utilized include but are not limited to a, load balancer, web switch and the like.

The information system can demand additional information system capacity from the infrastructure component. In response to the information system demanding additional information system capacity, the infrastructure component signals one or more additional information system servers to acquire a temporarily needed additional information system capacity.

When the magnitude of the headroom representation is less than the magnitude of the expected load feature from additional sessions, an infrastructure component, other than an information system server, can be signaled to first stage and configure the additional requested capacity and to determine the type of additional requested capacity needed. The infrastructure component then signals the infrastructure component to demand one or more additional information system servers to acquire temporarily needed additional information system capacity along with its requested configuration. A determination is also made as to where geographically and within the information system to request and acquire the demanded extra capacity determining the necessary speed or rate to acquire the demanded additional capacity.

A determination is also made of the quantity of demanded additional capacity that is required to be added to the information system. Additionally, a determination can be made as to when and how to remove the temporarily acquired additional capacity from the information system and return it to its original function.

A rate and method is ascertained for the removal of the temporarily acquired additional capacity from the information system and returning it to its original function In another method of the present invention, a representation of the session is generated. The representation includes a first plurality of parameters. The first plurality of parameters define a proposed additional load of the session on the information system server. A determination is then made of a current state representation of the information system server. The current state representation is defined by a second plurality of parameters and further defines a current load on the information system server at an instant in time. A determination is then made of a headroom representation for the current state of the information system. The headroom representation is a distance between a model surface. The model surface indicates a capacity of the information system server. A comparison is made of a magnitude of the headroom representation to a magnitude of the additional load of the session on the information server representation.

Representations for session, load, and information system capacity include but are not limited to any combination of Bayes Net models, feature vectors, linear regression models, linear and non-linear piecewise models, Support Vector Machine model, neural network models and the like.

Figure 9:
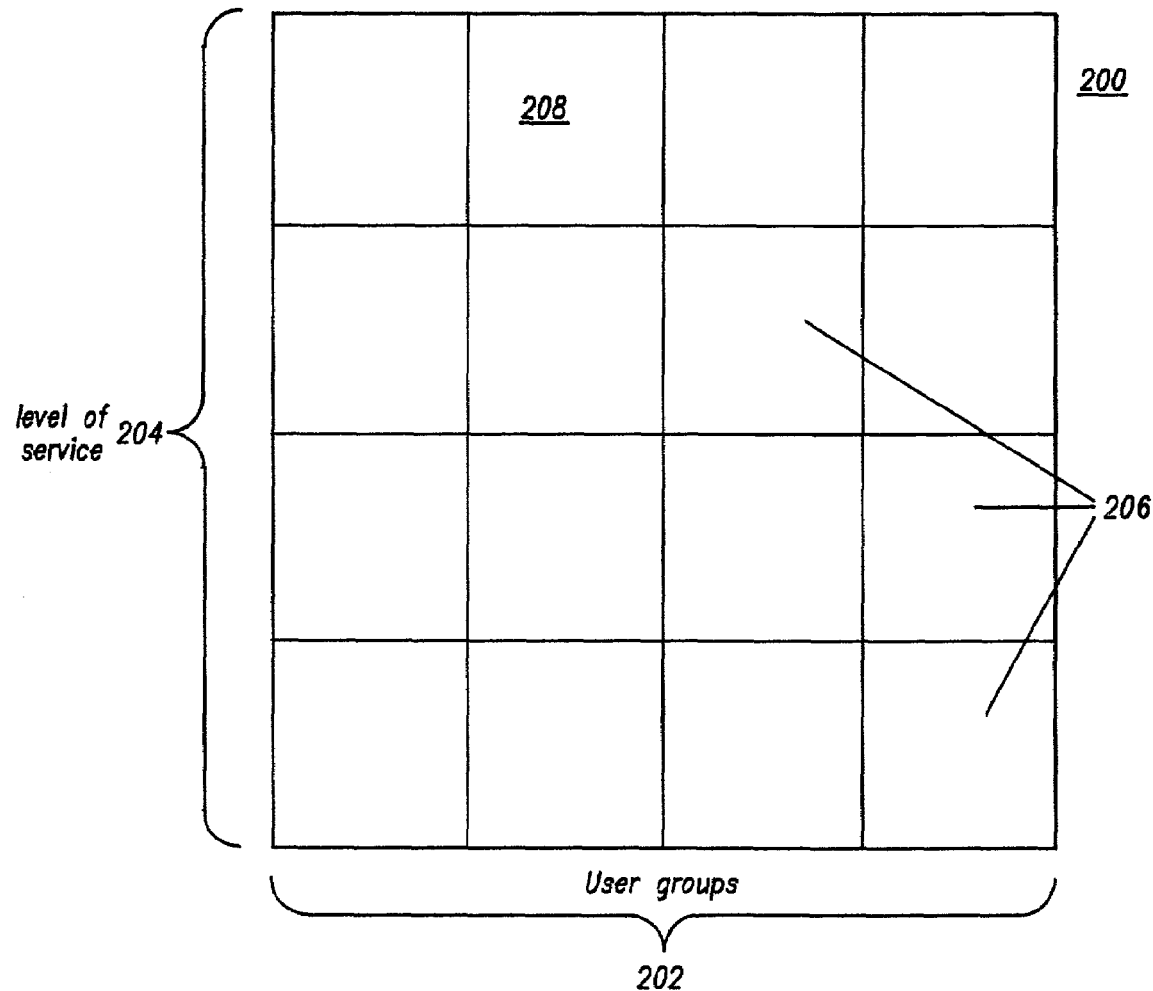
FIG. 9 represents a matrix of Service Level Agreements.

FIG. 9 illustrates a matrix 200 employed by embodiments of the invention in determining capacity. As depicted, the horizontal axis 202 indicates a user group; in embodiments of the invention, each user group may comprise a set of client IP addresses. The vertical axis 204 indicates a service, or application in the server. Other arrangements of cells in the matrix 200 will be apparent to those skilled in the art. The individual cells 206 represent individual Service Level Agreements, or SLAs. Thus, by way of example, an individual cell 208 may represent a user group which is promised a latency guarantee of 1000 milliseconds at 90% consistency. Capacity may be defined in terms of the matrix 200: An information system has capacity at a specified time if and only if a corresponding SLA is satisfied at that time. In some embodiments of the invention, the matrix 200 may be defined by a system administrator.

Figure 10:
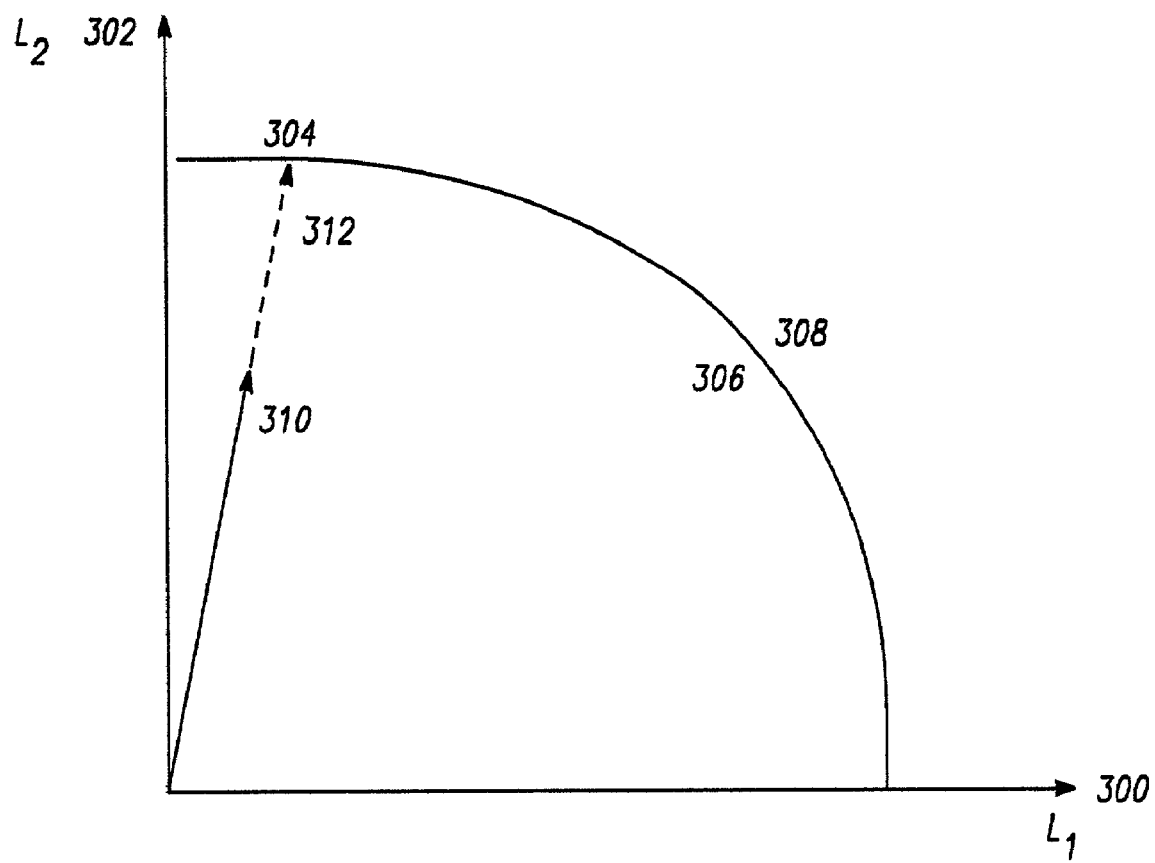
FIG. 10 schematically illustrates a simplified model of capacity on a network.

Embodiments of the model employ a Baysian belief model or a regression model for determining the capacity of the information system. Other embodiments may include support vector machines and neural networks. Such a model is illustrated in FIG. 10. The model represents mathematically a closed region or collection of regions in an n-space, where the dimensions in the n-space are the n-elements in the feature vectors, $L_1$ through $L_n$. The interior of the closed region correspond to states of the information system which have capacity; the exterior of the closed region correspond to states of the network which do not have capacity. FIG. 10 represents a simplified example model, where n=2, and the features are $L_1$ on the horizontal axis 300 and $L_2$ on the vertical axis 302. The model defines a decision boundary illustrated by the surface 304, wherein points within the surface 306 are states of the information system that have capacity, and points outside the surface 308 are states without capacity. In some embodiments, capacity models may be generated empirically, by inundating a network with a synthetic load, and measuring parameters such as latency and consistency, to determine the surface of the model.

The invention also introduces the concept of "headroom" in a model. In the example of FIG. 10, let a first vector 310 represent the current state of the system. The capacity left in the system may be represented as a second vector 312 between the first vector and the decision surface of the model 304. This second vector 312, may be referred to as the "headroom" in the current state of the network, as it indicates the amount of capacity left in the information system as computed by the model.

The concept of headroom is used to query the model regarding capacity. When a new session is to be introduced to the network, the session is represented as a vector, and the model is queried as to whether there is sufficient headroom 312 to accommodate the session vector. If the headroom is insufficient, extra capacity may be requested from additional information system resources coupled to the original information system. If no additional capacity is available, the session may be delayed, redirected, or declined.

The invention includes embodiments for computing models for different levels of performance, as represented by parameters such as latency and consistency. As such, these techniques allow models to be generated for the various cells 206 of the matrix 200.

Figure 11:
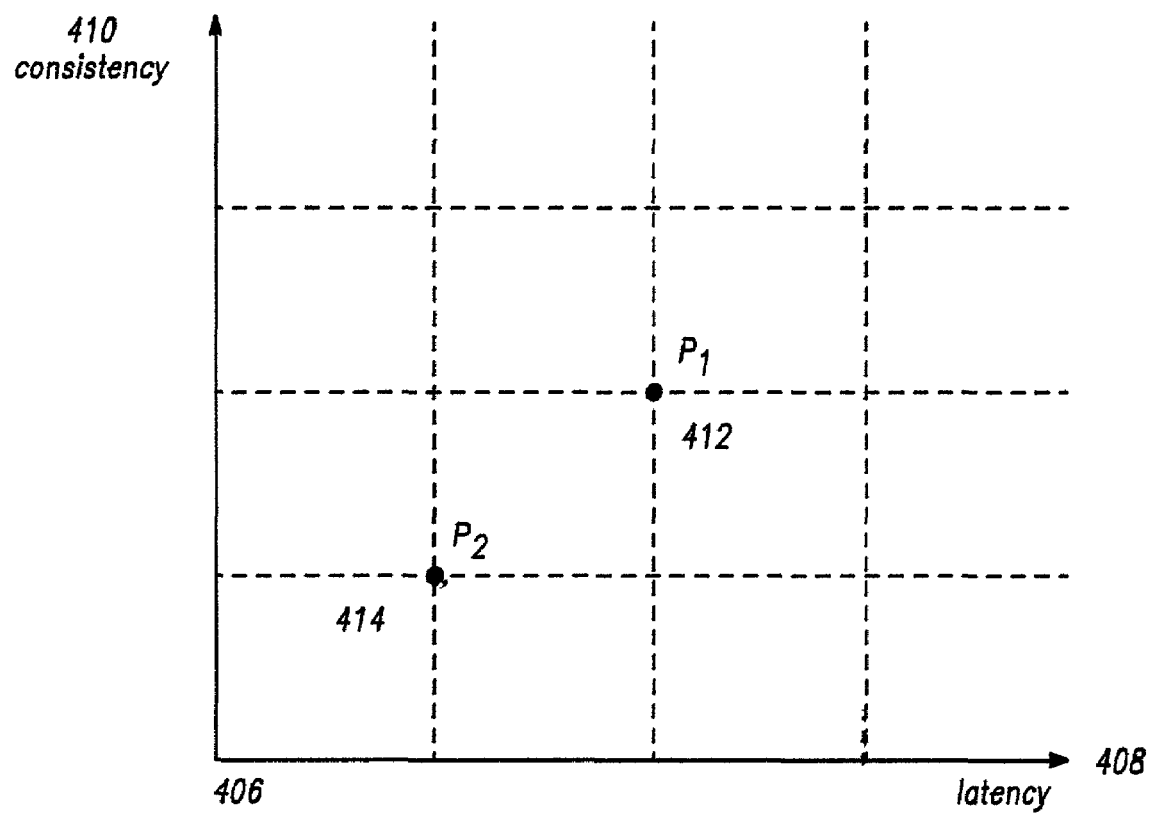
FIG. 11 depicts a monotonicity property of models in a network

A model generation technique employed in embodiments is illustrated in FIG. 11. The horizontal axis 400 plots latency, which decreases rightwards, and the vertical axis 402 plots consistency, which increases upwards. Individual points 404 in the 2-space 406 indicate the number of sessions the network can handle at the specified latency 408 and consistency 410. Monotonicity is imposed upon the model, so that for two points $P_1$ 412 and $P_2$ 414, wherein the consistency and latency requirements are greater for the first point $P_1$ 414 than the second $P_2$ 412, the number of sessions permitted at $P_2$ is greater than $P_1$. The latency-consistency grid 406 allows models to be computed on the basis of other models by use of a dynamic programming technique, as will be apparent to one skilled in the art.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

We claim:

1. A method of determining whether to accept a proposed session in an information system server, the method comprising:
    generating a session representation that represents the proposed session;
    wherein the session representation includes a first plurality of parameters;
    wherein the first plurality of parameters define a proposed additional load of the proposed session on the information system server;
    determining a current state of the information system server;
    generating a load representation that represents the current state of the information system;
    wherein the load representation includes a second plurality of parameters;
    wherein the second plurality of parameters define a current load on the information system server at a time instant;
    determining a headroom representation based on the load representation and a model surface;
    wherein the headroom representation reflects a distance between the model surface and the current load on the information system server;
    wherein the model surface indicates a capacity of the information system server; determining whether to accept the proposed session in the information system server based on a comparison between a magnitude of the headroom representation and a magnitude of the session representation.

2. The method of claim 1, wherein the step of generating a session representation includes generating a session representation based on one or more of:
    a typical feature vector,
    regression models,
    piecewise linear models for the proposed session, and
    non-linear models for the proposed session.

3. The method of claim 1, wherein the headroom representation is selected from at least one of a neural net, a support vector machine and a Bayes net.

4. The method of claim 1, further comprising:
    if the information system's quality of service objectives or performance objectives are being met, accepting the session in the information system server.

5. The method of claim 1, further comprising:
    if one or more of the information system's quality of service objectives or performance objectives is violated or in jeopardy of being violated, delaying, redirecting, or rejecting the session from the information system server.

6. The method of claim 1, further comprising:
    if one or more of the information system's quality of service objectives or performance objectives is violated or in jeopardy of being violated, demanding an extra capacity from a second information system server, the second information system server in communication with the first information system server.

7. The method of claim 6, further comprising:
    after demanding the extra capacity, accepting the session at the information system server.

8. The method of claim 6, further comprising:
    determining where geographically and within the information system to request and acquire the demanded extra capacity.

9. The method of claim 8, further comprising:
    determining an appropriate method of acquiring the demanded additional capacity.

10. The method of claim 8, further comprising:
    determining the necessary speed or rate to acquire the demanded additional capacity.

11. The method of claim 8, further comprising:
    determining the quantity of demanded additional capacity that is required to be added to the information system.

12. The method of claim 8, further comprising:
    determining when and how to remove the temporarily acquired additional capacity from the information system and return it to its original function.

13. The method of claim 8, further comprising:
    determining a rate to remove the temporarily acquired additional capacity from the information system and return it to its original function.

14. The method of claim 8, further comprising:
determining a method to remove the temporarily acquired additional capacity from the information system and return it to its original function.

15. The method of claim 1, further comprising:
if one or more of the information system's quality of service objectives or performance objectives is violated or in jeopardy of being violated, signaling an infrastructure component other than an information system server.

16. The method of claim 15, wherein the infrastructure component is a load balancer.

17. The method of claim 15, wherein the infrastructure component is a web switch.

18. The method of claim 15, wherein the information system demands additional information system capacity from the infrastructure component.

19. The method of claim 18, wherein in response to the information system demanding additional information system capacity, the infrastructure component signals one or more additional information system servers to acquire a temporarily needed additional information system capacity.

20. The method of claim 1, further comprising:
if the magnitude of the headroom representation is less than the magnitude of the expected load feature from additional sessions, signaling an infrastructure component other than an information system server to first stage and configure the additional requested capacity and to determine the type of additional requested capacity needed.

21. The method of claim 20, wherein subsequent to the infrastructure component request to first appropriately prepare stage and configure the additional requested capacity, the infrastructure component signals the infrastructure component to demand one or more additional information system servers to acquire temporarily needed additional information system capacity along with its requested configuration.

22. The method of claim 1, wherein the each of the first and second plurality of parameters includes one or many metrics for CPU loads on the information system server.

23. The method of claim 1, wherein the each of the first and second plurality of parameters includes at least one or many metrics for memory utilization on the information system server.

24. The method of claim 1, wherein memory utilization is selected from swaps, disk reads and faults.

25. The method of claim 1, wherein the information system server is selected from a web server, application server, database server, cache server, firewall server or any other type of server in the information system.

26. The method of claim 1, wherein the each of the first and second plurality of parameters includes at least one or many metrics for transactions per second conducted in databases on the information system server.

27. The method of claim 1, wherein the each of the first and second plurality of parameters includes a number of user sessions conducted on the information system server.

28. The method of claim 1, wherein the each of the first and second plurality of parameters includes one or many metrics for database utilization on the information system server.

29. The method of claim 1, wherein the each of the first and second plurality of parameters includes one or many metrics for the traffic on the network links between the different information system components.

\* \* \* \* \*